United States Patent [19]

Shirai

[11] Patent Number: 5,373,425
[45] Date of Patent: Dec. 13, 1994

[54] MOVABLE REFLECTOR TYPE AUTOMOBILE HEADLAMP

[75] Inventor: Katutada Shirai, Shizuoka, Japan

[73] Assignee: Koito Manufacturing Co., Ltd., Tokyo, Japan

[21] Appl. No.: 986,018

[22] Filed: Dec. 4, 1992

[30] Foreign Application Priority Data

Dec. 6, 1991 [JP] Japan .................. 3-322980
Dec. 10, 1991 [JP] Japan .................. 3-325756

[51] Int. Cl.⁵ .............................................. B60Q 1/04
[52] U.S. Cl. ....................................... 362/66; 362/80; 362/284; 362/428
[58] Field of Search .............. 362/61, 66, 80, 273, 362/284, 287, 289, 419, 428; 33/335, 379, 370, 376, 282, 284

[56] References Cited

U.S. PATENT DOCUMENTS

| | | | |
|---|---|---|---|
| 4,794,495 | 12/1988 | McMahan et al. | 362/289 |
| 4,916,583 | 4/1990 | Nagasawa | 362/284 |
| 4,916,586 | 4/1990 | Van Duyn et al. | 362/61 |
| 4,922,387 | 5/1990 | Ryder et al. | 362/287 |
| 4,970,629 | 11/1990 | McMahan | 362/419 |
| 5,063,480 | 11/1991 | McMahan et al. | 362/66 |
| 5,067,056 | 11/1991 | Suzuki et al. | 362/273 |
| 5,140,503 | 8/1992 | Lisak | 362/80 |

Primary Examiner—Ira S. Lazarus
Assistant Examiner—Y. Quach
Attorney, Agent, or Firm—Sughrue, Mion, Zinn, Macpeak & Seas

[57] ABSTRACT

A movable reflector type automobile headlamp in which the inclination of the reflector, and therefore the light beam, can be observed from in front of the headlamp. A level device is associated with the reflector, and an opening is provided in either the lamp body or the frame of the reflector such that the image of the level device is reflected by either a prism or a mirror, respectively, to the front of the headlamp. The inclination of the reflector is adjustable from in front of the headlamp through the use of interconnected aiming screws, gear mechanisms and adjusting screws. Further, a mechanically operated inclination detector is operatively connected with one of the adjusting screws for displaying a position of the reflector in a direction transverse to that indicated by the level device. The level device may be of a bubble type.

14 Claims, 11 Drawing Sheets

MOVABLE REFLECTOR TYPE AUTOMOBILE HEADLAMP

BACKGROUND OF THE INVENTION

The present invention relates to a movable reflector type headlamp in which a reflector is movably supported with respect to a lamp body, and particularly to a movable reflector type headlamp which includes an air bubble type level device for detecting the position of the reflector and, therefore, the reflected light, and for displaying the position at the front side of the headlamp.

Figure 18:
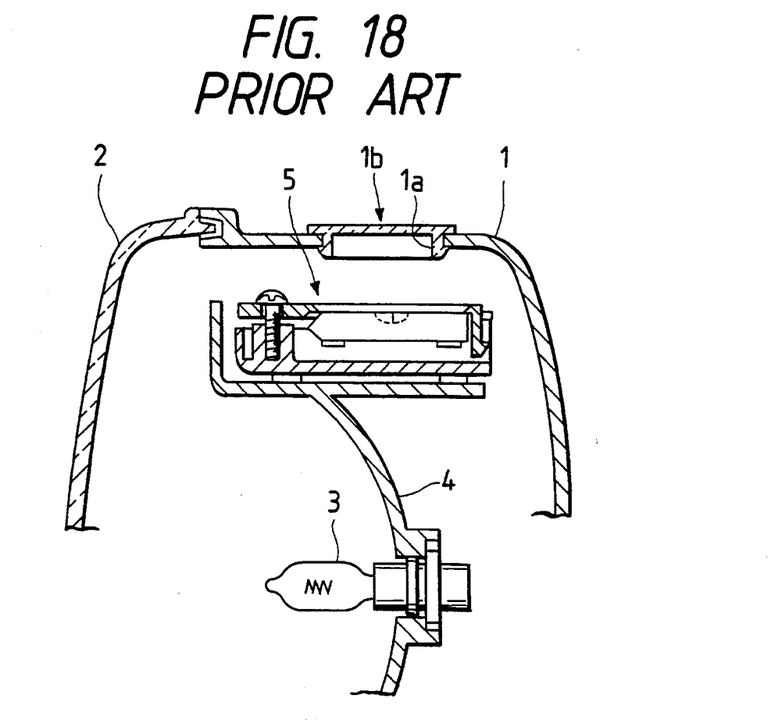
FIG. 18 is a sectional view of main portions of a movable reflector type conventional headlamp.

Various conventional automobile headlamps have been proposed. For example, in one of the headlamps a movable reflector type), as shown in FIG. 18, in a lamp chamber defined by a lamp body 1 and a front surface lens 2, a reflector 4 with a bulb 3 inserted therein is movably supported by an aiming mechanism (not shown). A level device 5, inclusive of a linear bubble vial, is mounted onto an upper surface of the reflector 1 such that the bubble vial extends in the longitudinal direction. Also, an opening 1a is formed in the upper surface wall of the lamp body 1, with a transparent cap 1b covering the opening 1a, thereby forming a viewing window through which the scale can be viewed from a position above the lamp body 1.

Figure 19:
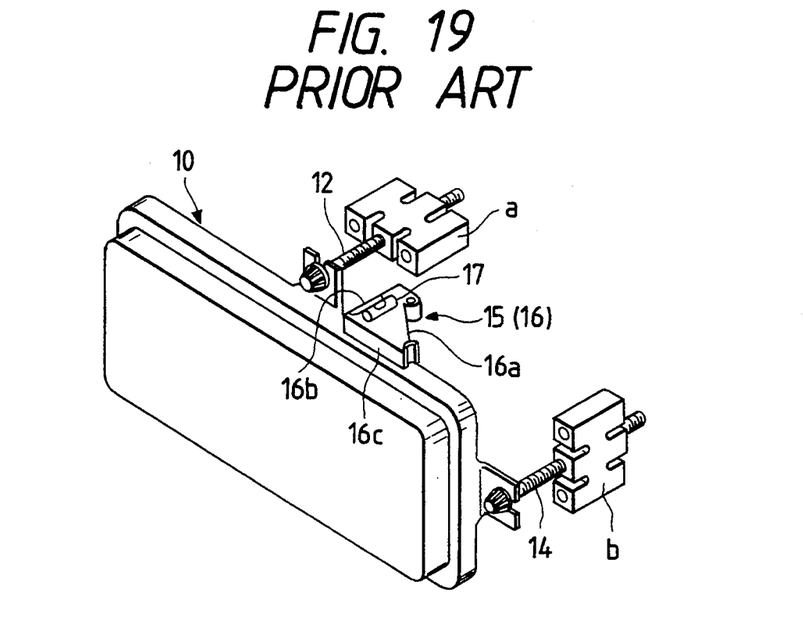
FIG. 19 is a perspective view of a movable unit type conventional headlamp.

FIG. 19 illustrates a movable unit type headlamp as disclosed in U.S. Pat. No. 4,802,067. A lamp body reflector unit 10, which includes a lamp body having a reflector formed integrally with the inner peripheral surface thereof, and a front surface lens assembled integrally to the lamp body, is supported by an aiming mechanism which includes aiming screws 12 and 14 provided at the sides of the lamp body such that the unit 10 can be pivoted with respect to the support members "a" and "b". In this movable unit type headlamp, a level device 15 is supported on a top surface of the reflector unit 10. The level device 15 includes a bubble vial 17 provided in a space formed within the level device housing 16. The level device housing 16 has a back surface 16a which is angled at 45° with respect to the side surface 16b and the front surface 16c of the housing 16, so that the level device housing 16 forms a reflecting prism, and so that the position of the air bubble can be read from a position in front of the headlamp, that is, through the front surface 16c of the level device housing 16.

In the above-described movable reflector type headlamp (FIG. 18), in order to read the bubble position of the level device, the automobile hood must first be opened and then the viewing window observed from above, making it difficult to read the scale.

Moreover, in the above-described movable unit type headlamp (FIG. 19), the level device 15 is mounted on the lamp body reflector unit 10 in such a manner that the device can be read from in front of the headlamp. In other words, since the level device housing 16 serves as a reflecting prism, the scale can be read from in front of the headlamp. However, in headlamps of a movable reflector type (as opposed to a movable unit type), the level device cannot be viewed directly from in front of the lamp body. In other words, the above-described level device which is effective in a headlamp of a movable unit type cannot be used in a headlamp of a movable reflector type. Thus, there is presently a strong demand for the development of means by which the scale on the movable reflector type headlamp can be read from in front of the headlamp.

SUMMARY OF THE INVENTION

A basic object of the present invention is to eliminate the drawbacks found in the above-mentioned conventional headlamps. Accordingly, it is an object of the present invention to provide an automobile headlamp of a movable reflector type which allows the scale of a level device mounted on a reflector to be read from the front surface side of the headlamp.

To achieve the above and other objects, according to the present invention there is provided an automobile headlamp of a movable reflector type having a reflector with a bulb, the reflector being movably supported with respect to a lamp body, a level device associated with the reflector for measuring the angular position of the reflector with respect to the vertical (up and down) direction, the position of the level device corresponding to an opening formed in one of the lamp body or the reflector, and a reflecting prism associated with the opening such that the level device can be read from in front of the headlamp. The level device may be of a conventional bubble vial type.

Two adjusting screws are provided on an exterior portion of the lamp body and are connected through a series of gears to respective aiming screws such that the movement of the reflector can be controlled from the front surface side of the headlamp.

One of the adjusting screws may be operatively connected with a mechanically operated inclination detector for measuring the amount of movement of the reflector in a direction transverse to that measured by the level device.

Thus, according to the present invention the level device can be read from a position in front of the headlamp without raising the hood of the automobile.

Also, according to the present invention the movement of the mirror can be adjusted from in front of the headlamp to change the positioning of the reflector in the right and left, and up and down directions.

DESCRIPTION OF THE PREFERRED EMBODIMENTS

The following is a description of the preferred embodiments of an automobile headlamp of a movable reflector type according to the present invention, with reference to the accompanying drawings.

A lamp housing or lamp body 20 includes a front surface opening to which a front surface lens 24 is fixed. The lamp body 20 and front surface lens 24 define a lamp chamber in which a reflector 26, with a light bulb 28 as the light source, is supported such that the reflector is tiltable in both horizontal and vertical planes.

Figure 1:
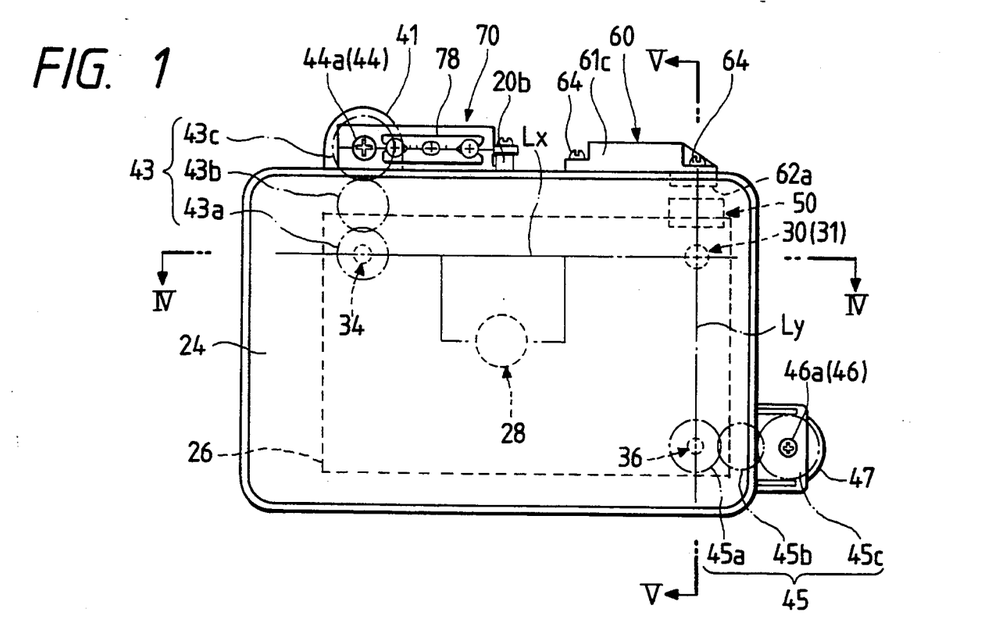
FIG. 1 is a front view of a first embodiment of a headlamp according to the present invention.
Figure 4:
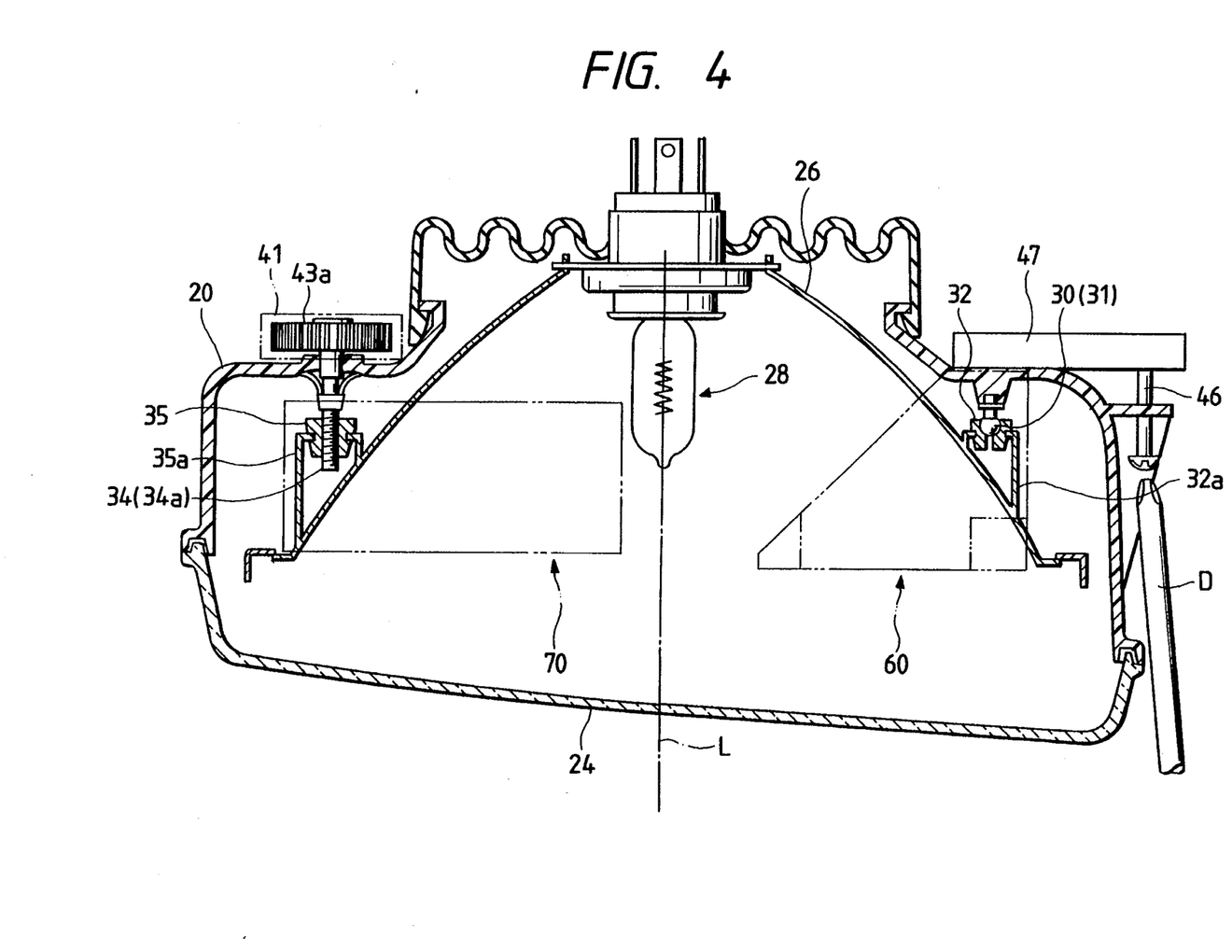
FIG. 4 is a horizontal sectional view of the first embodiment taken along the line IV—IV in FIG. 1.
Figure 5:
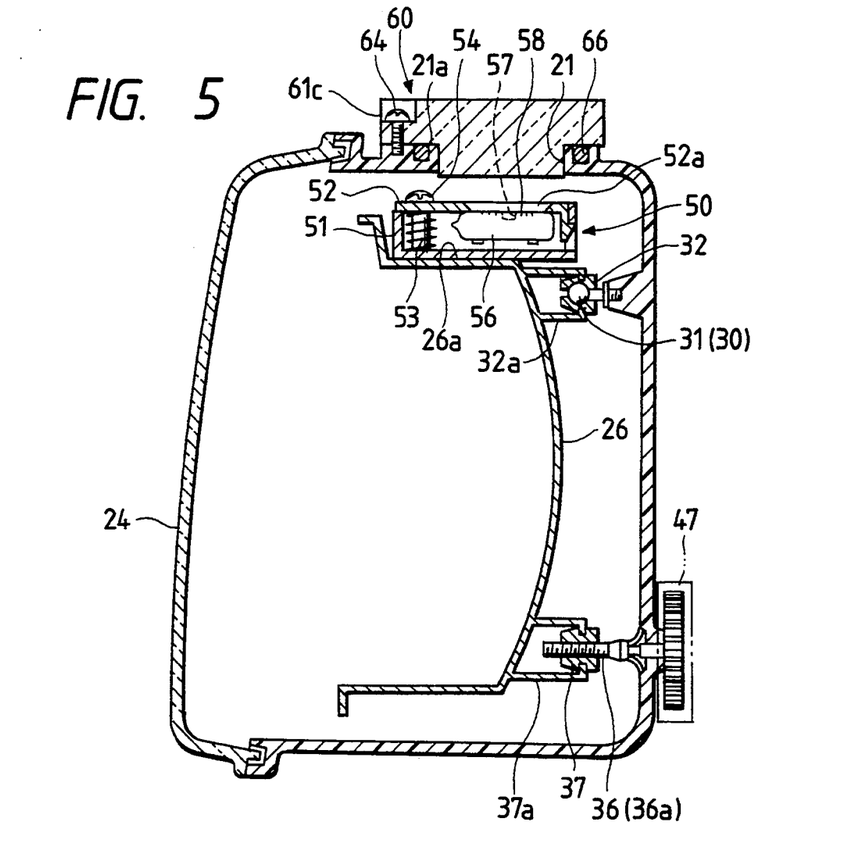
FIG. 5 is a longitudinal sectional view of the first embodiment taken along the line V—V in FIG. 1.

The reflector 26, as shown in FIGS. 1, 4 and 5, is supported at three points, that is, by a ball and socket joint 30, a right-and-left direction aiming screw 34, and an upward-and-downward direction aiming screw 36. The ball portion 31 of the ball and socket joint 30 is supported at one corner of the lamp body 20, and the reflector 26 is supported such that it can be swung about the ball and socket joint 30. The aiming screws 34 and 36, which are rotatably supported at opposite corners on the lamp body 20, include external thread portions 34a and 36a, respectively, which are threadably connected to nuts 35 and 37, respectively, which nuts are provided at the opposite corners of the reflector 26. A socket 32, which supports the ball portion 31, is fixed to and supported by a bracket 32a which projects from the rear side of the reflector. The nuts 35 and 37, threadably connected to the screw external thread portions 34a and 36a, are fixed to and supported by brackets 35a and 37a, respectively, provided on the back side of the reflector. When the aiming screws 34 and 36 are rotated, the nuts 35 and 37 are then moved back and forth along the aiming screws 34 and 36, thereby varying the inclination of the reflector 26.

The supporting point of the reflector 26 by the right-and-left direction aiming screw 34 (that is, the threadedly connecting portion of the aiming screw 34 and nut 35) intersects the axis of radiation "L" of the headlamp (see FIG. 4) at right angles and is situated on a horizontal axis "Lx" passing through the ball and socket joint 30 (see FIG. 1), while the supporting point of the reflector 26 by the vertical direction aiming screw 36, that is, the threadedly connecting portion of the aiming screw 36 and nut 37, intersects the radiation axis "L" of the headlamp at right angles and is situated in a vertical axis "Ly" passing through the ball and socket joint 30. For this reason, when the aiming screw 34 is rotated, the nut 35 is advanced or retracted along the screw 34, and the reflector 26 is inclined around the vertical axis "Ly", thereby adjusting the inclination of the reflector 26 and, consequently, the angle of the light beam with respect to the lamp body 20, in the right and left direction. On the other hand, when the aiming screw 36 is rotated, the nut 37 is advanced or retracted along the screw 36, and the reflector 26 is inclined around the horizontal axis "Lx" intersecting the vertical axis "Ly" at right angles, thereby adjusting the inclination of the reflector 26 and, consequently, the angle of the light beam with respect to the lamp body 20, in the vertical direction.

Figure 7:
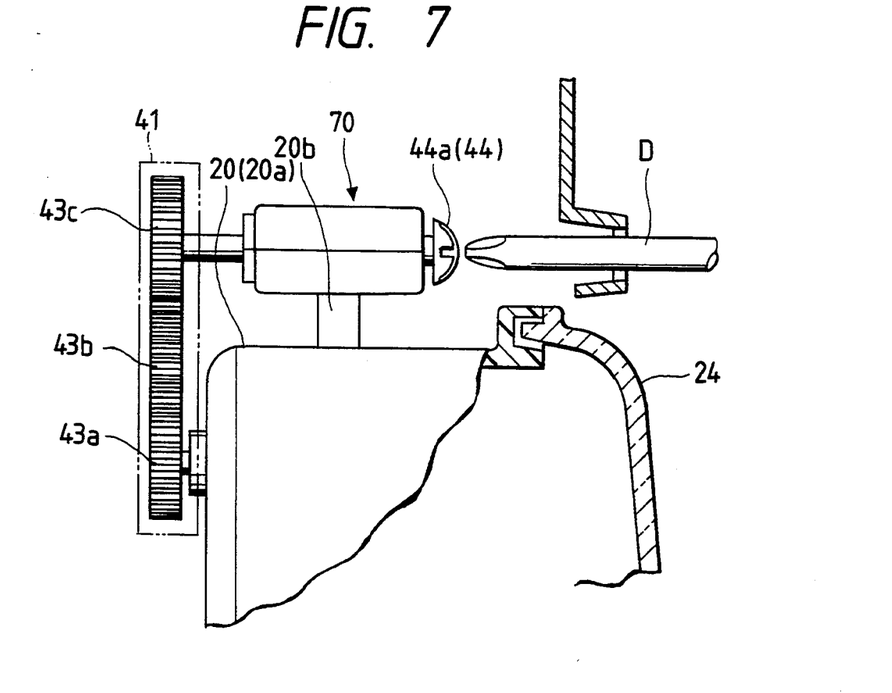
FIG. 7 is a longitudinal sectional view of the first embodiment showing an inclination detection device.

The aiming screw 34 is linked with an adjustment screw 44 of an inclination detector 70 (described below) by means of a gear mechanism 43 composed of three spur gears 43a, 43b and 43c, while the aiming screw 36 is linked with an adjustment shaft 46 by means of a gear mechanism 45 composed of three spur gears 45a, 45b and 45c. Thus, the aiming screws 34 and 36 are rotated in synchronization with the rotation of the adjustment screw 44 and the adjustment shaft 46, respectively. The adjustment screw 44 and adjustment shaft 46 extend forwardly along the wall surface of the lamp body 20 on the outer side thereof, and the adjustment screw 44 (adjustment shaft 46) includes, in the front end portion thereof, a driver engagement portion 44a (46a) which is engageable with the leading end portion of a screwdriver D. The driver engagement portions 44a and 46a, as shown in FIGS. 4 and 7, are disposed so that they can be engaged from the front surface of the headlamp by the screwdriver D. Thus, it is possible to easily adjust the inclination of the reflector 26 and, consequently the light beam, in the horizontal and vertical directions, from in front of the headlamp. Gear cases 41, 47 house the gear mechanisms 43, 45, respectively. A level device 50 (FIG. 5) includes a case 51 in which is mounted a linear bubble vial 56. The level device 50 is secured to an upper surface wall 26a of the reflector 26 and detects the vertical inclination of the reflector and, consequently, the vertical inclination of the light beam. The case 51 is a rectangular housing which opens upwardly.

A bubble vial 56 is suspended from and supported by a cover member 52 of the case 51. An air bubble 57 moves along a scale 58 with changes in the vertical inclination of the reflector 26. The cover member 52 includes an opening 52a exposing the scale 58 on the bubble vial 56. One end of the cover member 52 is engaged with the side wall of the case in an uneven lance manner, while the opposite end is resiliently supported by a compression coil spring 53 and a screw 54, so that the position of the air bubbles in the bubble vial 56 can be adjusted by operating the screw 54, i.e., so that a calibration or zero point adjustment is performed.

Figure 2:
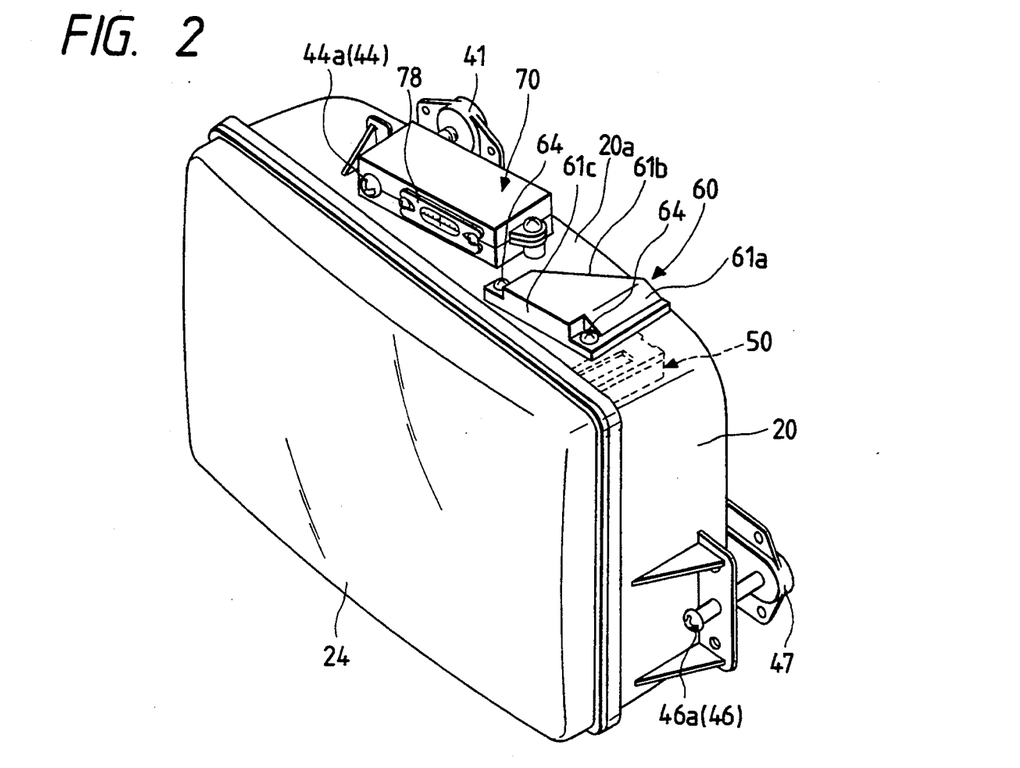
FIG. 2 is a perspective view of the first embodiment.
Figure 3:
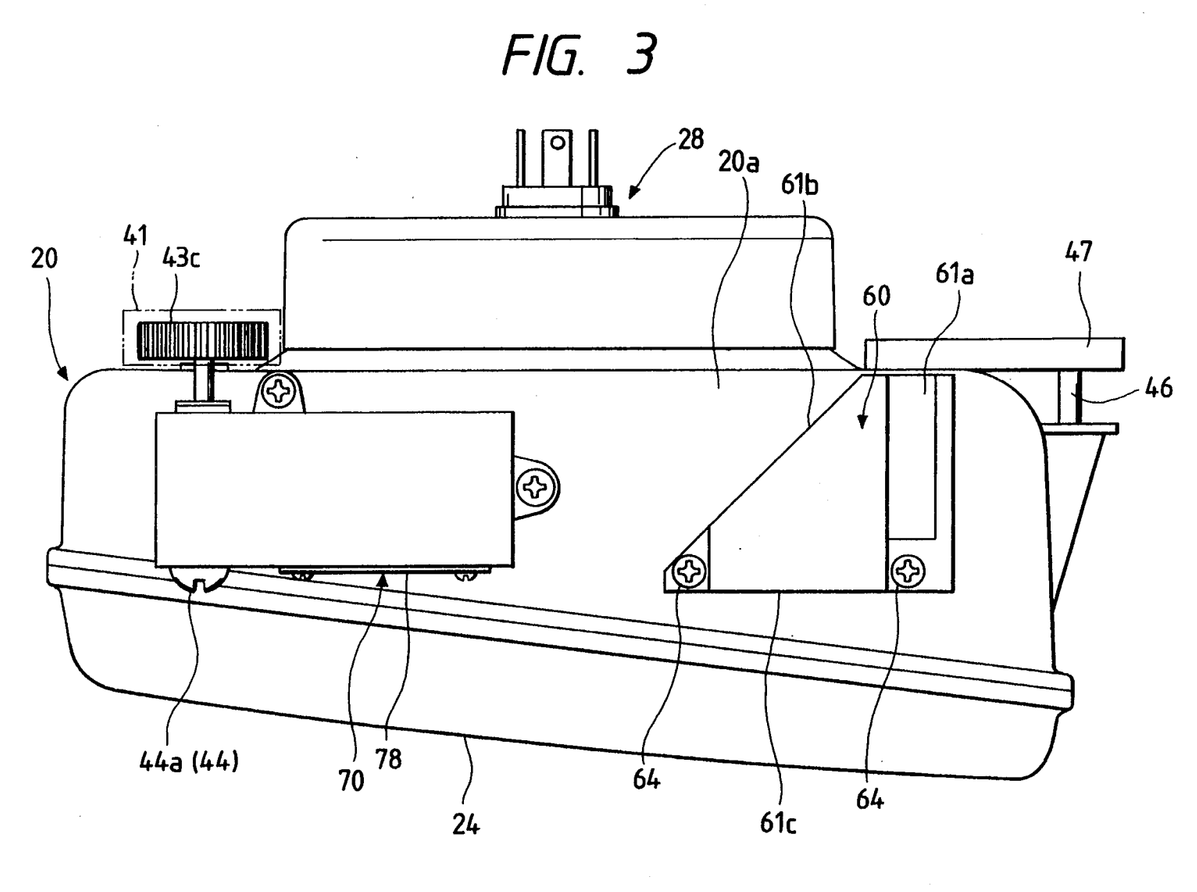
FIG. 3 is a plan view of the first embodiment.
Figure 6:
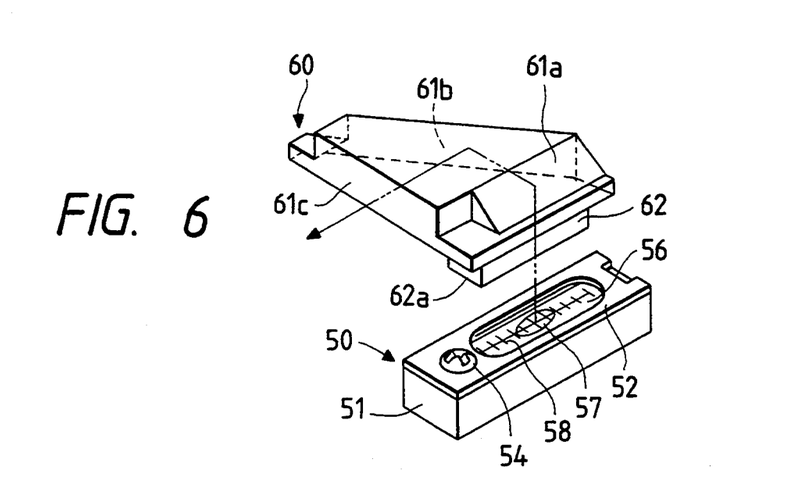
FIG. 6 is a perspective view of a reflecting prism employed in the present invention showing the operation thereof.

An opening 21 (FIG. 5) is formed in a portion of the upper surface wall of the lamp body adjacent to the level device 50, in which opening 21 there is provided a reflecting prism 60 which reflects the image of the scale 58 of the level device 50 to the front surface of the headlamp. The reflecting prism 60 may be formed, for example, from a transparent glass or heat resistant resin. As shown in FIGS. 1, 2 and 6, the prism 60 has a substantially triangular shape which includes a downwardly projecting portion 62 substantially the same size as the bubble vial 56. A first plane 61a is formed in a portion of the upper surface of the reflecting prism 60 corresponding to the downward projecting portion 62, and the first plane 61a is inclined at an angle of 45° with respect to the lower surface 62a of the downward projecting portion 62. The reflecting prism 60 further includes a front surface 61c and a second plane 61b which is inclined at an angle of 45° with respect to the first plane 61a.

The light that enters the first and second planes 61a and 61b is totally reflected, and the light that enters the reflecting prism 60 from the downward projecting portion 62 is guided by the first and second planes 61a and 61b through the reflecting prism front surface 61c, as shown by the arrow in FIG. 6. The front surface 61c of the reflecting prism 60, as shown in FIGS. 1 and 5, is situated above the upper peripheral portion of the front surface lens 24, and light from outside of the lamp body passes through the transparent reflecting prism 60 provided in the opening 21 into the lamp body to brighten the peripheries of the level device 50, so that the bubble position of the bubble vial 56 can be easily observed from a position in front of the front surface 61c of the reflecting prism 60. A screw 64 is used to fix the reflecting prism 60 to the upper surface wall of the lamp body. A seal groove 21a is formed along a peripheral portion of the opening 21, on the lamp body side (FIG. 5). If a seal packing 66 is inserted into the seal groove 21a, the opening 21 can be hermetically sealed.

An inclination detector 70 is used to detect the inclination of the reflector 26 and, consequently, the light beam, in the right and left directions. The inclination detector 70 is secured to the frame by screws or the like, and supported by a boss portion 20b which protrudes from the upper surface wall 20a of the lamp body 20. The inclination detector 70, as shown in detail in FIGS. 8–10, includes an adjustment screw 44 which is rotatably supported within a case 71 formed by engaging an upper case 71a with a lower case 71b, a back-and-forth slider or "longitudinal slider" (a first slider) 72 which is threadedly engaged with the adjustment screw 44 and which can be slid axially in accordance with the rotation of the adjustment screw 44, a right-and-left slider or "transverse slider" (a second slider) 74 which is stored in the case 71 so as to be transversely slidable and which is engageable with the longitudinal slider 72 in an inclined sliding manner so that the transverse slider 74 is transversely slidable in synchronization with the sliding motion of the longitudinal slider 72, a pointer 75a which is a relative indicator formed between the transverse slider 74 and the lamp body 20 and is disposed on the transverse slider 74 side, and a scale plate 78 disposed on the case side.

Figure 8:
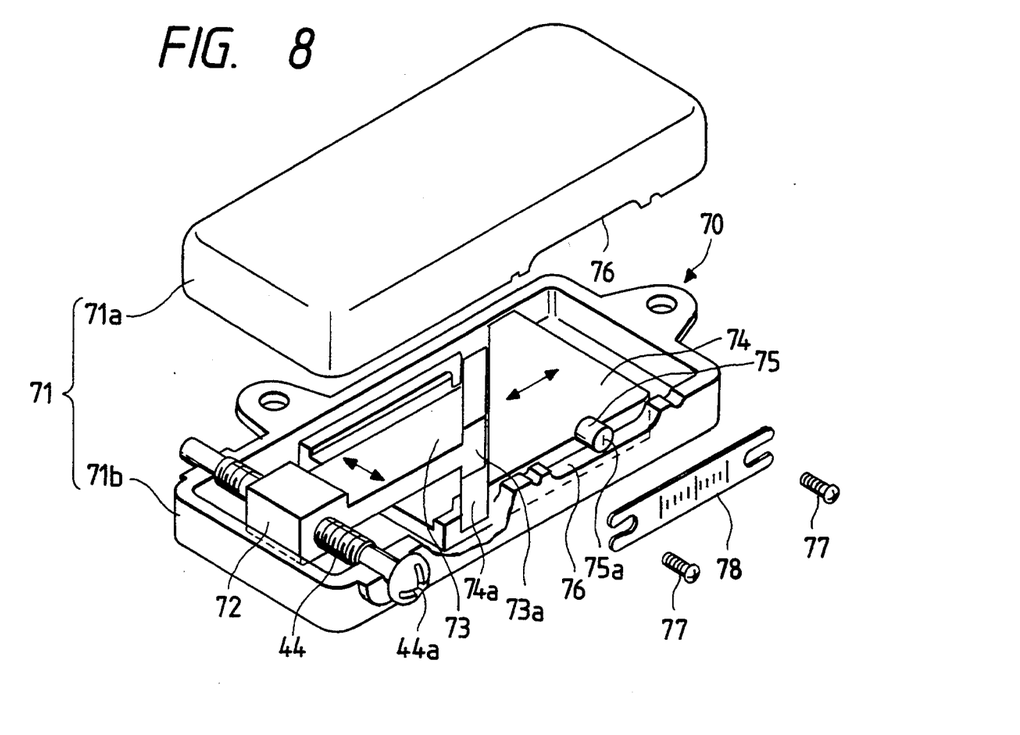
FIG. 8 is a perspective view of the internal structure of the inclination detection device.
Figure 9:
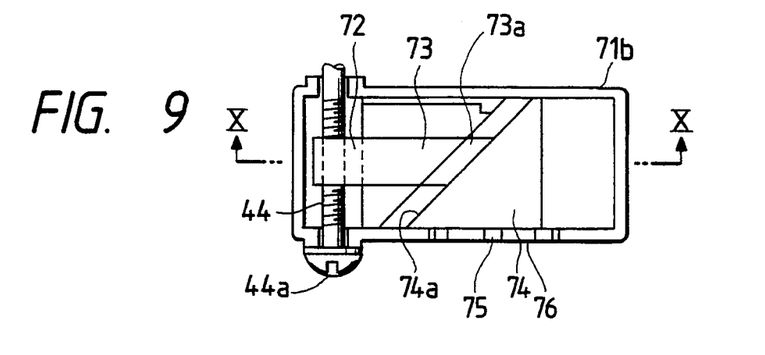
FIG. 9 is a plan view of the internal structure of the inclination detection device.
Figure 10:
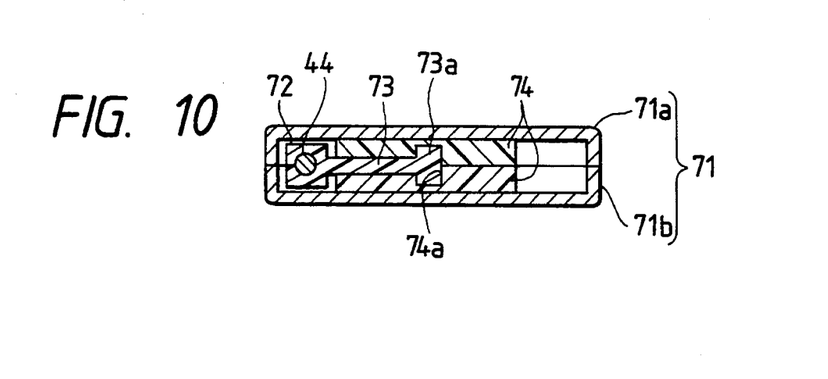
FIG. 10 is a sectional view of the inclination detection device taken along the line X—X in FIG. 9.

The transverse slider 74 includes an inclined slide groove 74a which is inclined at an angle of 45° with respect to the adjustment screw 44, while the longitudinal slider 72 includes a horizontal arm 73 having a leading end portion of a T-shaped section which is engageable with the inclined slide groove 74a. Accordingly, if the longitudinal slider 72 is slid axially, i.e., back and forth in accordance with the rotation of the adjustment screw 44, then the inclined slide groove 74a is pressed against the leading end portion 73a of the horizontal arm 73 such that the transverse slider 74 is moved transversely, i.e., in the right to left or left to right directions.

The transverse slider 74 includes a projection 75 on its front surface which projects into an elongated opening 76 formed in the case front surface wall. The pointer 75a is provided on the leading end face of the projection 75. A transparent scale plate 78 is secured by screws 77 to the case front surface side and can be adjusted in position in the right and left direction, i.e., the transverse direction. The two end portions of the scale plate 78 are forked. Thus, when the screws 77 are loosened, the scale plate 78 can be slid transversely so that the zero point of a scale marked on the scale plate coincides with the pointer 75a.

Figure 11:
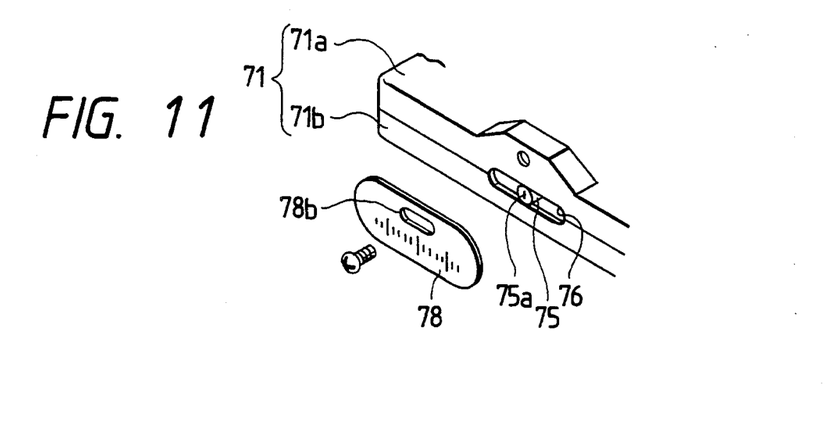
FIG. 11 is a perspective view of main portions of a modification of the inclination detection device.
Figure 12:
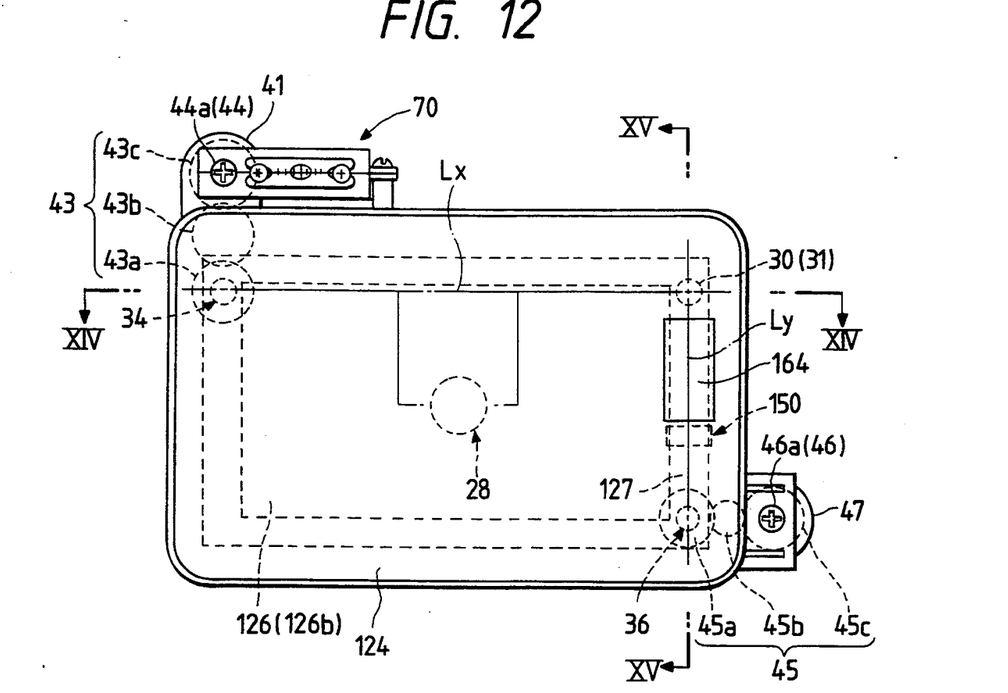
FIG. 12 is a front view of a second embodiment of a headlamp according to the present invention.
Figure 13:
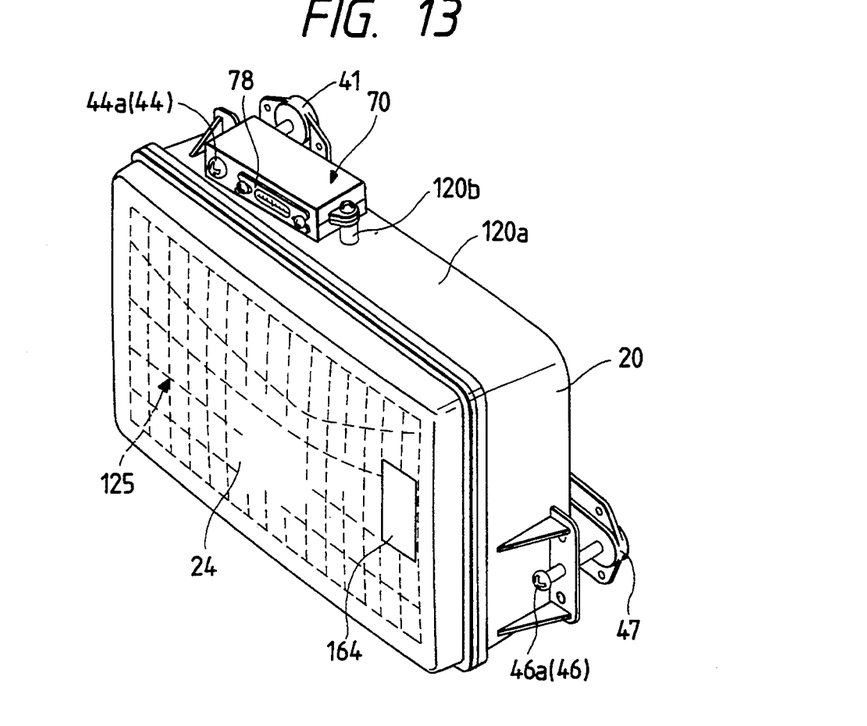
FIG. 13 is a perspective view of the second embodiment.
Figure 14:
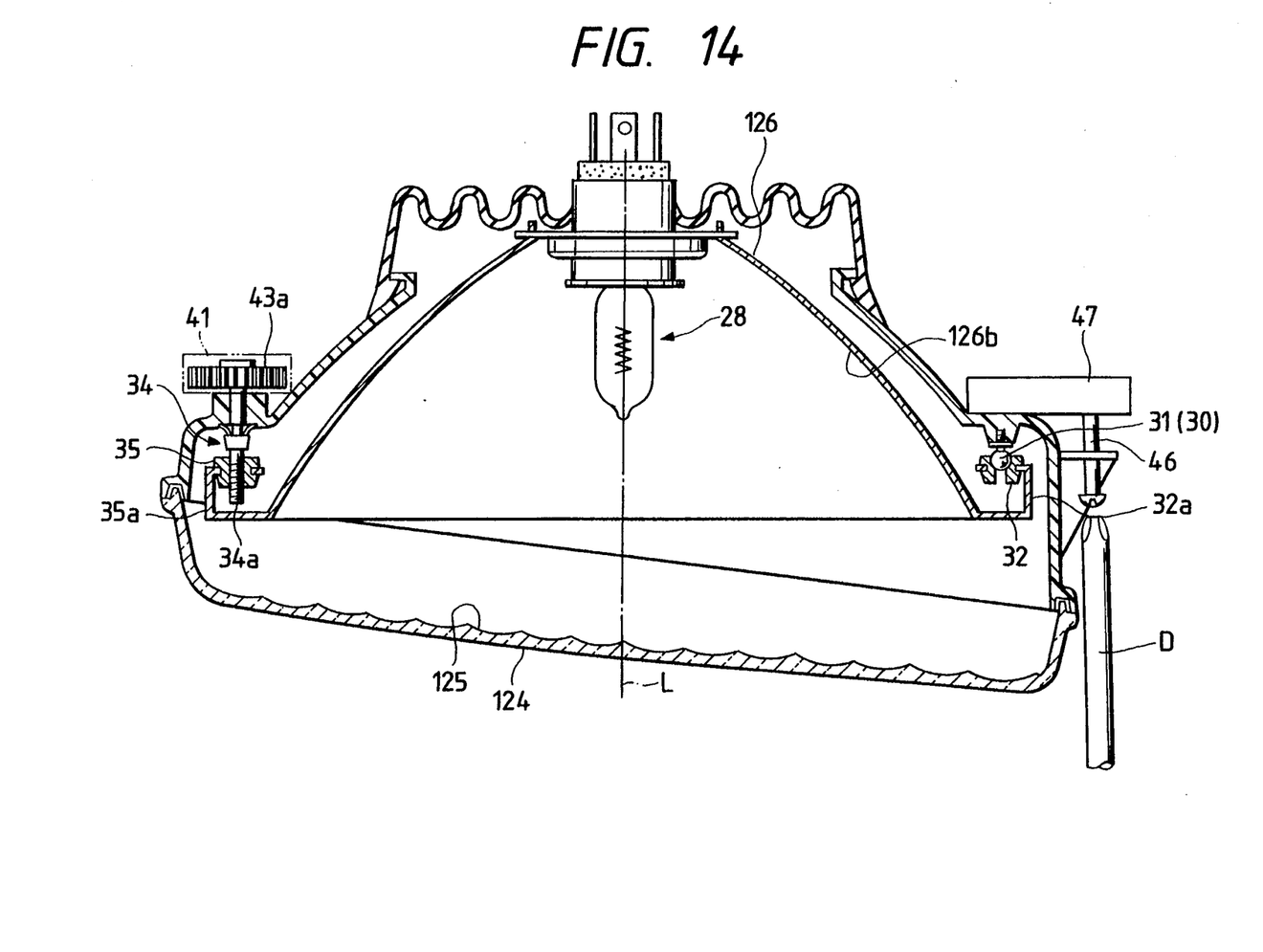
FIG. 14 is a horizontal sectional view of the second embodiment taken along the line XIV—XIV in FIG. 12.
Figure 15:
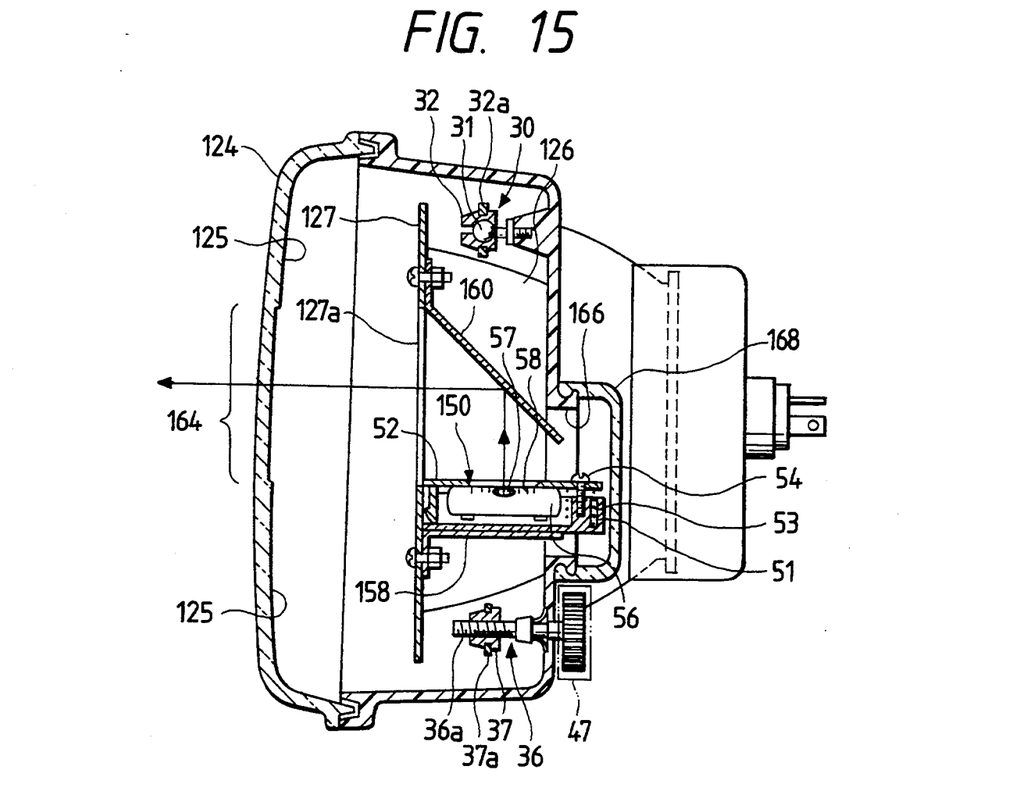
FIG. 15 is longitudinal sectional view of the second embodiment, taken along the line XV—XV in FIG. 12.
Figure 16:
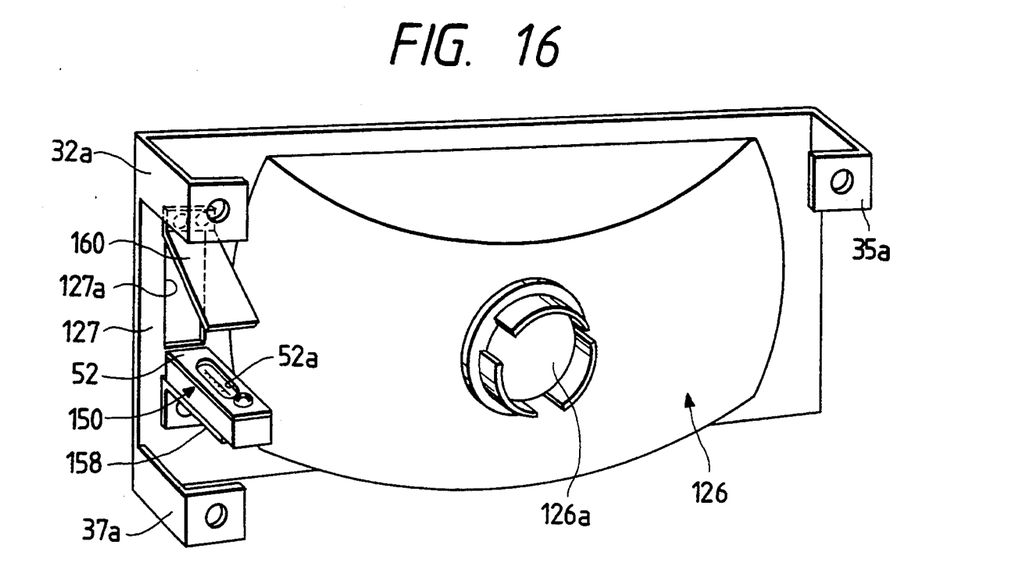
FIG. 16 is a perspective view of a reflector employed in the second embodiment of the present invention, viewed from the back surface thereof.

Alternatively, as shown in FIG. 11, a screw hole 78b disposed on the scale plate 78 side may be formed as an elongated hole in the transverse direction, and the scale plate 78 may be adjusted in position so as to zero the device, i.e., to perform calibration.

The air bubble position of the level device 50 and the scale zero point position of the inclination detector 70 are respectively adjusted such that the zero point is indicated when the angle of radiation of the headlamp is in a proper state after the vehicle is set in a horizontal position and the adjustment screw 44 and adjustment shaft 46 have been operated rotatively. That is, the level device 50 is calibrated by removing the reflecting prism 60 and operating the screw 54 from the opening 21, while the inclination detector 70 is zero adjusted by adjusting the transverse position of the scale plate 78. Then, at the user's side, if the reflector 26 is shifted from a proper position, the shift in the vertical direction is indicated as a shift of the bubble of the level device 50, while the shift in the transverse direction is indicated as a shift of the pointer with respect to the scale on the inclination detector 70. Since these shifts can be read on the reflecting prism 60 and the scale plate 78 from in front of the headlamp, the adjustment screw 44 and adjustment shaft 46 can be easily operated so as to eliminate such shifts, thereby achieving an aiming adjustment.

FIGS. 12–16 illustrate a second embodiment of an movable reflector type automobile headlamp according to the present invention. In these figures, diffusing steps 125 are formed on the rear surface of the front surface lens 24 for controlling the light distribution pattern. Also, a bulb insertion hole 126a is formed in the rear top portion of a reflector 126.

The second embodiment is substantially identical in structure to the first embodiment described above. In the second embodiment, the same reference numerals are to identify the same parts as in the first embodiment, and hence a further detailed description of these parts is omitted.

A level device 150 includes a case 51 containing a linear bubble vial 56. The level device 150 is mounted on a horizontal bracket 158 provided in a flat-plate-like peripheral frame 127 of the reflector 126. The level device 150 detects the inclination of the reflector and, consequently, the light beam, in the vertical, i.e., up and down, direction. The case 51 is a rectangularly shaped housing opening upwardly. A bubble vial 56 is suspended from and supported by a cover member 52. An air bubble 57 moves along a scale 58 in accordance with the vertical tilt angle of the reflector 126. The cover member 52 has an opening 52a exposing the scale on the bubble vial 56. One end of the cover member 52 is engaged with the side wall of the case in an uneven lance manners while the opposite end is resiliently supported by a compression coil spring 53 and a screw 54, so that the position of the air bubbles within the bubble vial 56 can be calibrated, i.e., a zero point adjustment, simply by rotating the screw 54.

A plane mirror 160 is provided above the level device 150, the mirror 160 being fixed to a peripheral frame 127 of the reflector by a screw and extending at an angle of inclination of 45° with respect to the bubble vial 56. The plane mirror 160 may be formed, for example, from a glass plate, a resin plate or a metal plate, and the surface of the glass, resin or metal plate of the plane mirror 160 may be treated, for example, by aluminum evaporation (as is the reflector), such that the plane mirror 160 reflects the image of the scale to the front of the headlamp. An opening 127a is formed in a portion of the peripheral frame 127 opposed to the plane mirror 160, and a through portion 164 is formed in the front surface lens 124 at a position opposed to the opening 127a, a step 125 for controlling the distribution of light no longer being necessary in this portion 164. Further, in the portion of the lamp body back surface wall corresponding to the level device 150, there is formed an opening 166 (FIG. 15) for admitting light, a flexible and transparent cap 168 being removably mounted thereto. Accordingly, since a small amount of light is permitted to enter the scale forming surface of the level device 150 from the opening 166, the shifted air bubble position can be read sufficiently from the bubble vial 56 of the level device 150 reflected on the plane mirror 160 through the through portion 164 formed in the front surface lens 124.

The air bubble position of the level device 150 and the 15 scale zero point position of the inclination detector 70 are respectively adjusted such that the zero point is indicated when the vehicle is set in a horizontal position and when the adjustment screw 44 and adjustment shaft 46 have been turned to thereby set the illumination angle of the headlamp in a proper state. In the level device 150, the zero point adjustment can be carried out by removing the cap 168 and rotating the screw 54 through the opening 166. On the other hand, with respect to the inclination detector 70, the zero point adjustment can be carried out by adjusting the right and left position of the scale plate 78. After completion of the zero point adjustment, the vertical movement of the headlamp can be read from the level device 150, while the horizontal movement is indicated on the scale of the inclination detector 70. As in the first embodiment, shifts from the proper position can be read from the front side of the headlamp. Then, the adjustment shaft 46 and the adjustment screw 44 can be rotated to thereby perform the aiming adjustment.

Figure 17:
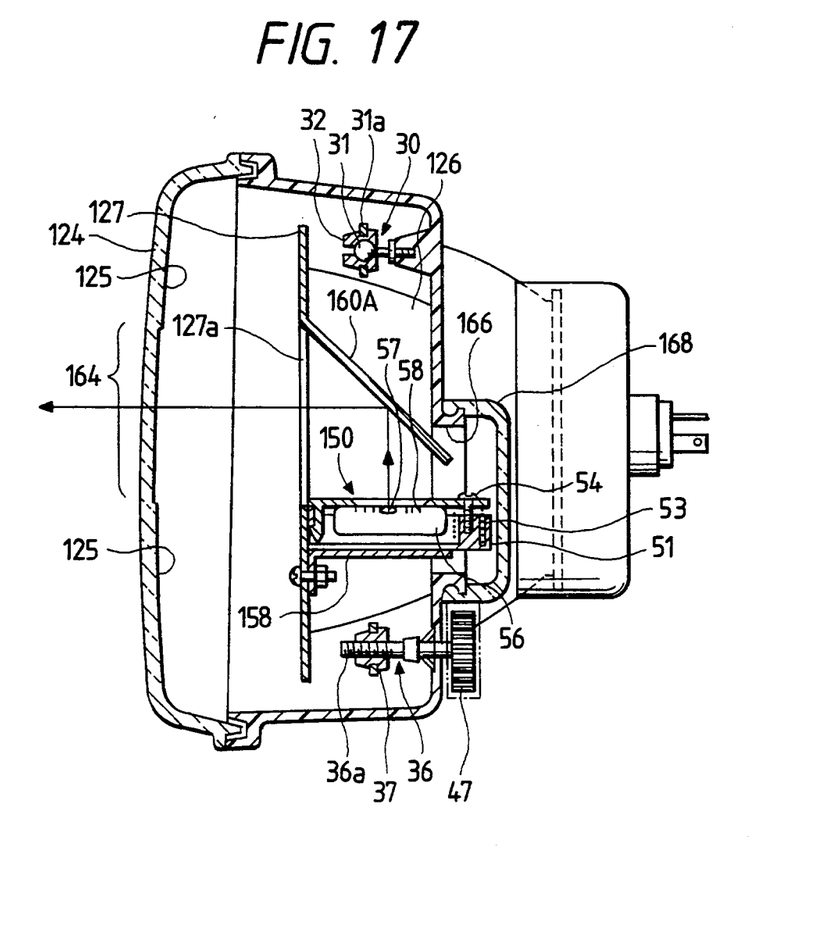
FIG. 17 is a sectional view of main portions of a third embodiment of a headlamp according to the present invention.

FIG. 17 shows a sectional view of main portions of a third embodiment of a headlamp according to the present invention.

In the third embodiment, part of the peripheral frame 127 of the reflector 126 is used to form a plane mirror 160A. In other words, the surface of the peripheral frame area 127 of the reflector 126 may be treated by aluminum evaporation, in the same manner as the reflecting surface 126b of the reflector 126. The portion of the peripheral frame area 127 which is disposed above, and which corresponds to, the level device, is cut in a U-like shape, and the resulting area is folded rearwardly at an angle of 45° so as to form both an opening 127a and a plane mirror 160A. The remaining portions of the third embodiment are similar in structure to the second embodiment described above. Thus, the same parts are identified by the same reference numerals as in the first and second embodiments, and hence a further detailed description of these parts is omitted.

In the illustrated embodiments, the gear mechanisms 43 (45), each including a plurality of spur gears, are used for connecting the adjustment screw 44 (46) with the aiming screw 34 (36). However, the invention is not limited to the use of spur gears, i.e., other transmission mechanisms may be used such as pulley and belt mechanisms, rack and pinion mechanisms or the like.

Also, a description has been provided above of a movable reflector type headlamp wherein the light reflected by the paraboloidal reflector 26 (126) is controlled and distributed by light distribution control steps formed on the front surface lens 124. However, the present invention can also be applied similarly to a headlamp of a projection type wherein the light reflected by a substantially ellipsoidal reflector is projected and distributed by a projection lens.

As can be clearly understood from the foregoing description, in accordance with an automobile headlamp of a movable reflector type according to the present invention, the reflecting prism provided on the upper surface wall of the lamp body makes it possible to read, from the front surface side of the headlamp, the air bubble position of the level device indicating the degree of inclination of the reflector in the vertical direction, so that the degree of inclination of the illumination angle of the headlamp in the vertical direction can be determined very easily.

Furthermore, the position of the reflector can be adjusted from the front of the headlamp by the use of aiming screws, a gear mechanism and adjusting screws. Also, an inclination detector may be operatively connected with one of the adjustment screws to indicate a position of the reflector and, consequently, the light beam, in a direction transverse to that indicated by the level device.

As can be further clearly understood from the foregoing description, in accordance with an automobile headlamp of a movable reflector type according to the present invention, the air bubble position of the level device can be read from the front surface side of the headlamp through the through portion of the front surface lens, which makes it much easier to confirm the degree of inclination of the illumination angle of the headlamp in the vertical direction thereof.

What is claimed is:

1. An automobile headlamp of a movable reflector type, comprising:
    a lamp body;
    a light bulb for producing a light beam;
    a movable reflector disposed within said lamp body and associated with said light bulb for reflecting a light beam at a desired inclination angle corresponding to an angular position of said reflector;
    a level device associated with said reflector for indicating said angular position of said reflector and an angle of inclination of said light beam, an opening being formed in one of said lamp body and said reflector at a position corresponding with said level device; and
    reflecting means associated with said opening formed in said one of said lamp body and said reflector, whereby light from said level device passes through said opening and is reflected by said reflecting means in a direction such that the position of said reflector, as indicated by said level device, can be read from a front side of said lamp body via said reflecting means and said opening.

2. The automobile headlamp as recited in claim 1, further comprising:
    a ball-and-socket joint provided at one corner of said reflector for movably supporting said reflector within said lamp body; and
    a right-and-left-direction aiming screw and an upward-and-downward-direction aiming screw provided, respectively, at opposite corners of said reflector adjacent to said one corner at which said ball-and-socket joint is provided for adjusting the position of said reflector.

3. The automobile headlamp as recited in claim 2, further comprising:
   a gear assembly; and
   an adjustment screw linked with respective ones said aiming screws, via said gear assembly, for adjusting the position of said reflector.

4. The automobile headlamp as recited in claim 3, further comprising an inclination detector linked with one of said adjustment screws for indicating the position of said reflector in rightward and leftward directions in a horizontal plane.

5. The automobile headlamp as recited in claim 4, wherein said inclination detector comprises:
   a casing secured to said lamp body and having an opening formed at a front side of said casing;
   a longitudinal slider housed within said casing, said longitudinal slider being threadably engaged with said one of said adjustment screws for movement in a front-to-rear direction;
   a horizontal arm protruding from said longitudinal slider in a left-to-right direction, a tip end of said arm having a T-shaped cross section and being inclined at a predetermined angle from the front-to-rear and left-to-right directions;
   a transverse slider having an inclined contact surface and a groove formed therein, said groove being engaged with said T-shaped cross section on said tip end of said horizontal arm so that said transverse slider is moved in a left-to-right direction when said one of said adjustment screws is rotated and said horizontal arm moves in the front-to-rear direction; and
   a pointer and scale associated with said transverse slider for indicating a relative amount of movement of said transverse slider and said reflector.

6. The automobile headlamp as recited in claim 5, wherein said scale comprises a scale plate, said scale plane having forked ends and being attached to said casing over said opening formed in the front of said casing by said forked ends, said inclination detector being calibrated by adjusting a position of said scale plate with respect to said opening.

7. The automobile headlamp as recited in claim 5, wherein said scale comprises a scale plate, said scale plate having a transversely extending mounting hole and being attached to said casing over said opening formed in the front of said casing at said mounting hole, said inclination detector being calibrated by adjusting a position of said scale plate with respect to said opening.

8. An automobile headlamp of a movable reflector type, comprising:
   a lamp body;
   a light bulb for producing a light beam;
   a movable reflector disposed within said lamp body and associated with said light bulb for reflecting a light beam at a desired inclination angle corresponding to an angular position of said reflector;
   a level device associated with said reflector for indicating said angular position of said reflector and an angle of inclination of said light beam, said lamp body being provided with an opening at a position corresponding with said level device; and
   a reflecting prism associated with said opening formed in said lamp body, whereby light from said level device passes through said opening and is reflected by said prism in a direction such that said angular position of said reflector, as indicated by said level device, can be read from a front side of said lamp body through said prism and said opening.

9. The automobile headlamp as recited in claim 8, wherein said level device detects a vertical position of said reflector, and wherein said level device is mounted on an upper surface of said reflector and said reflecting prism is mounted on an upper surface of said lamp body, said opening being formed in said lamp body between said level device and said reflecting prism.

10. An automobile headlamp of a movable reflector type, comprising:
    a lamp body; a light bulb for producing a light beam; a movable reflector disposed within said lamp body and associated with said light bulb for reflecting a light beam at a desired inclination angle corresponding to an angular position of said reflector; a level device mounted on a flat-plate-like peripheral frame of said reflector for indicating said angular position of said reflector and an angle of inclination of said light beam, said flat-plate-like peripheral frame being provided with an opening at a position corresponding to said level device; and a plane mirror associated with and extending from said flat-plate-like peripheral frame adjacent to said level device and said opening such that said position of said reflector, as indicated by said level device, can be read through said mirror and said opening from a front side of said lamp body; and wherein light from said level device passes through said opening and is reflected by said plane mirror.

11. The automobile headlamp as recited in claim 10, further comprising means for fastening said plane mirror to said peripheral frame so that said mirror extends rearwardly from said frame at a predetermined angle.

12. The automobile headlamp as recited in claim 11, wherein said plane mirror is formed of a material selected from the group consisting of a glass plate, a resin plate and a metal plate, and wherein a surface of said mirror is treated by aluminum evaporation.

13. The automobile headlamp as recited in claim 10, wherein said plane mirror is formed from a cut portion of said flat-plate-like peripheral frame, said cut portion forming a flap and being bent rearwardly from said frame at a predetermined angle.

14. The automobile headlamp as recited in claim 13, wherein said plane mirror is formed of a material selected from the group consisting of a glass plate, a resin plate and a metal plate, and wherein a surface of said mirror is treated by aluminum evaporation.

* * * * *